United States Patent
Zhang et al.

(10) Patent No.: US 10,935,155 B2
(45) Date of Patent: Mar. 2, 2021

(54) ELECTRONIC EXPANSION VALVE, CONTROL SYSTEM, AND CONTROL METHOD

(71) Applicant: Hangzhou Sanhua Research Institute Co., Ltd., Zhejiang (CN)

(72) Inventors: Bin Zhang, Zhejiang (CN); Yaofeng Lan, Zhejiang (CN); Junxiao Jiang, Zhejiang (CN)

(73) Assignee: Hangzhou Sanhua Research Institute Co., Ltd., Zhejiang (CN)

( * ) Notice: Subject to any disclaimer, the term of this patent is extended or adjusted under 35 U.S.C. 154(b) by 77 days.

(21) Appl. No.: 16/326,156

(22) PCT Filed: Aug. 11, 2017

(86) PCT No.: PCT/CN2017/097048
§ 371 (c)(1),
(2) Date: Feb. 15, 2019

(87) PCT Pub. No.: WO2018/033025
PCT Pub. Date: Feb. 22, 2018

(65) Prior Publication Data
US 2019/0178404 A1 Jun. 13, 2019

(30) Foreign Application Priority Data

Aug. 18, 2016 (CN) .......................... 201610688346.4

(51) Int. Cl.
*F16K 31/04* (2006.01)
*F25B 49/00* (2006.01)
(Continued)

(52) U.S. Cl.
CPC ............ *F16K 31/042* (2013.01); *F16K 31/04* (2013.01); *F16K 37/0025* (2013.01); *F25B 49/00* (2013.01); *H02K 37/00* (2013.01)

(58) Field of Classification Search
CPC .... F16K 31/042; F16K 31/04; F16K 37/0025; F16K 37/0041; F25B 49/00; H02P 29/02; H02P 8/36; H02K 37/00
See application file for complete search history.

(56) References Cited

U.S. PATENT DOCUMENTS

| 4,794,312 A | 12/1988 | Kano et al. |
| 6,460,567 B1 | 10/2002 | Hansen, III et al. |
| 7,988,124 B2 * | 8/2011 | Watanabe ............... F16K 31/04 251/129.12 |

(Continued)

FOREIGN PATENT DOCUMENTS

| CN | 1065562 A | 10/1992 |
| CN | 101517292 A | 8/2009 |

(Continued)

OTHER PUBLICATIONS

Extended European Search Report for European Application No. 17840999.1, dated Apr. 6, 2020.

(Continued)

*Primary Examiner* — Eric Keasel
(74) *Attorney, Agent, or Firm* — Wolf, Greenfield & Sacks, P.C.

(57) ABSTRACT

Provided are an electronic expansion valve, a control system, and a control method, including: a step motor and a Hall sensor; the step motor includes a rotor and a stator; the rotor includes a permanent magnet; the Hall sensor is provided on the outer periphery of the permanent magnet; the Hall sensor and rotor are arranged in the radial direction, and the stator and Hall sensor are arranged in the axial direction; the main-body part of the Hall sensor is used for sensing the magnetic pole change of said permanent magnet; such a structure reduces the effect that an operating environment has on the Hall sensor when detecting a signal.

8 Claims, 6 Drawing Sheets

(51) Int. Cl.
*H02K 37/00* (2006.01)
*F16K 37/00* (2006.01)

(56) References Cited

U.S. PATENT DOCUMENTS

| | | | |
|---|---|---|---|
| 8,476,796 B2* | 7/2013 | Tang | H02K 29/08 |
| | | | 310/68 B |
| 9,746,199 B1* | 8/2017 | Drees | F24F 11/76 |
| 2009/0194721 A1 | 8/2009 | Watanabe et al. | |
| 2012/0104903 A1 | 5/2012 | Tang | |
| 2015/0077033 A1 | 3/2015 | Lee et al. | |
| 2015/0326158 A1 | 11/2015 | Furlan et al. | |

FOREIGN PATENT DOCUMENTS

| CN | 201830125 U | 5/2011 |
|---|---|---|
| CN | 103944343 A | 7/2014 |
| CN | 103968621 A | 8/2014 |
| CN | 104092344 A | 10/2014 |
| CN | 204597830 U | 8/2015 |
| DE | 100 58 441 A1 | 5/2001 |
| DE | 10 2006 026 537 A1 | 12/2007 |
| EP | 0 992 397 A1 | 4/2000 |
| GB | 2 525 866 A | 11/2015 |
| JP | H07-310844 A | 11/1995 |
| JP | 2003-194252 A | 7/2003 |
| JP | 2003-329698 A | 11/2003 |
| JP | 2010-078002 A | 4/2010 |
| JP | 2015-105715 A | 6/2015 |

OTHER PUBLICATIONS

International Search Report and Written Opinion for International Application No. PCT/CN2017/097048, dated Nov. 15, 2017.

* cited by examiner

ELECTRONIC EXPANSION VALVE, CONTROL SYSTEM, AND CONTROL METHOD

This application is a national stage filing under 35 U.S.C. § 371 of International Patent Application Serial No. PCT/CN2017/097048, filed Aug. 11, 2017, which claims priority to Chinese Patent Application No. 201610688346.4, titled "ELECTRONIC EXPANSION VALVE, CONTROL SYSTEM, AND CONTROL METHOD FOR CONTROL SYSTEM", filed on Aug. 18, 2016 with the Chinese State Intellectual Property Office. The entire contents of these applications are incorporated herein by reference in their entirety.

FIELD

The present application relates to the field of automobile, and in particular to an electronic expansion valve, a control system and a control method.

BACKGROUND

An electronic expansion valve includes a stepping motor. The stepping motor is controlled to rotate by a controller, and rotor locking of the stepping motor may occur if there is an obstacle during the rotation of the stepping motor. In a case that the rotor locking of stepping motor occurs, if the controller is not able to accurately detect the rotor locking and take corresponding measures, the operation of the electronic expansion valve may be abnormal. Or, if the controller reports the rotor locking information of the stepping motor by mistake, the operation of the electronic expansion valve may also be abnormal.

Therefore, it is necessary to improve the above technology, so as to address the technical issues.

SUMMARY

An object of the present application is to provide an electronic expansion valve, a control system and a control method, to improve the detection accuracy of a stepping motor.

In order to achieve the above object, a technical solution is provided according to the present application. An electronic expansion valve includes a stepping motor, a Hall sensor, and a circuit board. The stepping motor includes a rotor and a stator, the rotor includes a permanent magnet, the permanent magnet includes at least two pairs of magnetic poles, and the stator includes a coil and a magnetic conductive portion. The magnetic conductive portion is arranged at a periphery of the permanent magnet, the Hall sensor is arranged at the periphery of the permanent magnet, and the Hall sensor is located at one end of the magnetic conductive portion. The Hall sensor includes a body portion and a connecting portion, both the connecting portion and the coil are electrically connected to the circuit board, and the body portion is configured to sense magnetic pole changes of the permanent magnet. A sum of a length of the body portion and a length of the magnetic conductive portion may be less than a length of the permanent magnet.

Another technical solution is provided according to the present application. An electronic expansion valve includes a stepping motor, a Hall sensor, and a circuit board. The stepping motor includes a rotor and a stator, and the rotor includes a permanent magnet. The permanent magnet includes at least two pairs of magnetic poles, each of the magnetic poles includes a periphery, an upper end and a lower end. The periphery extends in an axial direction of the rotor, and the upper end and the lower end extend in a radial direction of the rotor. The stator includes a coil and a stator core, the stator core is configured to support the coil, and the stator core is arranged to surround the permanent magnet. The Hall sensor is arranged at a periphery of the permanent magnet, and the Hall sensor is located at one end of the stator core. The Hall sensor includes a body portion and a connecting portion, both the connecting portion and the coil are electrically connected to the circuit board. The body portion is arranged close to the periphery of the magnetic pole, and at least a part of the body portion is always between the upper end and the lower end of the magnetic pole during movement of the permanent magnet.

Yet another technical solution is provided according to the present application. An electronic expansion valve includes a stepping motor, a Hall sensor, and a circuit board. The stepping motor includes a rotor and a stator, the rotor includes a permanent magnet, the permanent magnet includes at least two pairs of magnetic poles, and the stator includes a coil and a magnetic conductive portion. The magnetic conductive portion is arranged at a periphery of the permanent magnet, the Hall sensor is arranged at the periphery of the permanent magnet, and the Hall sensor is located at one end of the magnetic conductive portion. The Hall sensor includes a body portion and a connecting portion, both the connecting portion and the coil are electrically connected to the circuit board, and the body portion is configured to sense magnetic pole changes of the permanent magnet. The stepping motor includes an injection molding portion, and the injection molding portion includes a first partition portion and a second partition portion. The electronic expansion valve has a first cavity and a second cavity, and the first cavity and the second cavity are isolated from each other by the first partition portion. The Hall sensor is arranged in the first cavity, the rotor is arranged in the second cavity, the Hall sensor and the stator are isolated from each other by the second partition portion, and an accommodation portion configured for fixing the Hall sensor is formed at the second partition portion.

A control system is provided according to the present application. The control system includes a stepping motor, a controller and a Hall sensor. The stepping motor includes a rotor and a stator, and the rotor includes a permanent magnet. The Hall sensor is arranged at a periphery of the permanent magnet, and the Hall sensor is configured to detect magnetic field changes of the rotor and obtain feedback signals. When the control system is in operation, the controller is configured to acquire the feedback signals in real time and obtain operation duration of each of the feedback signals. A first time period is prestored in the controller, and the controller is configured to determine whether the operation duration is equal to the first time period. In a case that the operation duration is equal to the first time period, it is determined that the electronic expansion valve is in normal operation; and in a case that the operation duration is not equal to the first time period, it is determined that rotor locking of the stepping motor occurs, and the controller emits a locked rotor signal.

A control method for the control system is provided according to the present application. The control system includes a controller, a stepping motor, a Hall sensor, a valve body and a valve needle. The stepping motor includes a rotor and a stator, the rotor is connected to the valve needle, and the valve body is connected to the stator. A first flow channel and a second flow channel are formed in the valve body, and the valve needle cooperates with the valve body to allow or shut off communication between the first flow channel and the second flow channel. The Hall sensor detects magnetic pole changes of the rotor and generates feedback signals. The control method includes following steps.

Starting the control system, and driving, by the rotor, the valve needle to move from a position, at which the valve needle was stopped last time, to an upper dead point, and then to a lower dead point and stop at the lower dead point. Defining a position, at which the valve needle is stopped at the lower dead point, as a mechanical zero. Restarting the control system, driving, by the rotor, the valve needle to move from the lower dead point to the upper dead point, and detecting the feedback signals at the same time. Defining, before the first flow channel and the second flow channel are in communication with each other, a point at which the valve needle is located when a feedback signal jumps during upward movement of the valve needle as a Hall origin. Defining a number of pulses between the Hall origin and a point at which the valve needle is located when the first flow channel and the second flow channel are in communication with each other as a valve opening pulse.

The electronic expansion valve employs an independent Hall sensor to perform detection, which reduces the influence of the operating condition of the electronic expansion valve on the detection, and is beneficial for improving the detection accuracy.

DETAILED DESCRIPTION OF EMBODIMENTS

The present application is further illustrated hereinafter in conjunction with drawings and specific embodiments.

Figure 1:
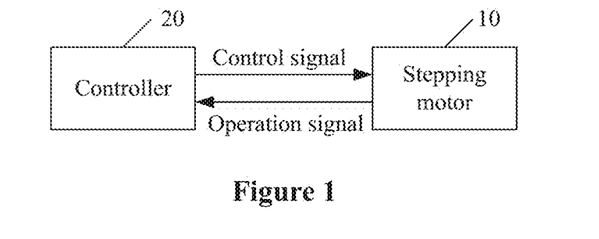
FIG. 1 is a system diagram of an electronic expansion valve according to the present application.

Referring to FIG. 1, an electronic expansion valve includes a stepping motor 10. A controller 20 acquires operating signals of the stepping motor 10, and emits different control signals to the stepping motor 10 according to the acquired operating signals, in this way, the controller 20 is able to control the stepping motor 10. A power source supplies electricity to the stepping motor 10 and the controller 20. The controller 20 may be arranged at the electronic expansion valve. Or, instead of being arranged at the electronic expansion valve, the controller 20 may also be arranged at a system where the electronic expansion valve is employed, and a an actuator configured for receiving the control signals and converting the control signals to driving signals is arranged at the electronic expansion valve, in this way, an object of the present application may also be realized.

Figure 2:
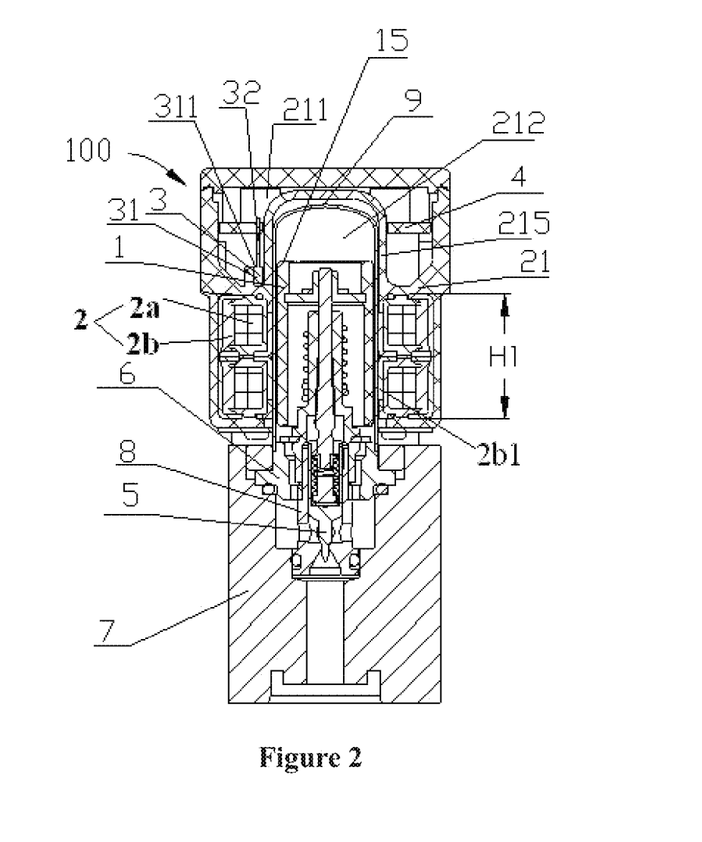
FIG. 2 is a schematic view showing the structure of an electronic expansion valve according to an embodiment of the present application.
Figure 3:
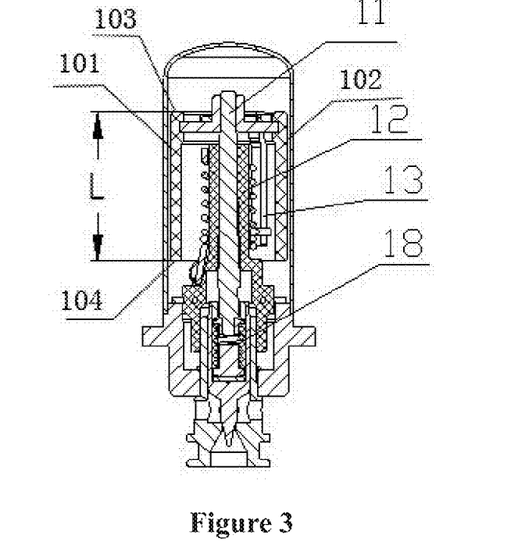
FIG. 3 is a schematic view showing part of the structure in FIG. 2.

Referring to FIGS. 2 and 3, the electronic expansion valve 100 includes a stepping motor 10. The stepping motor 10 includes a rotor 1 and a stator 2, the rotor 1 includes a permanent magnet, and the permanent magnet includes at least two pairs of magnetic poles 101. Each of the magnetic poles 101 includes a periphery 102, an upper end 103 and a lower end 104. The periphery 102 extends in an axial direction of the rotor 1, and the upper end 103 and the lower end 104 extend in a radial direction of the rotor 1. The stator 2 includes a coil 2a and a stator core 2b, and the stator core 2b provides support for the coil 2a. The stator core 2b includes a magnetic conductive portion 2b1, the coil 2a is energized with a current changing regularly, and then an excitation magnetic field is formed at the magnetic conductive portion 2b1. A magnetic field of the permanent magnet of the rotor 1 interacts with the excitation magnetic field of the stator 2, and the rotor 1 is able to rotate around a center axis. The electronic expansion valve 100 further includes a Hall sensor 3 and a circuit board 4, and the Hall sensor 3 is configured to detect magnetic field changes of the rotor 1 and generate feedback signals. The controller includes a microprocessor which is fixed on the circuit board 4, and microprocessor is configured to acquire the feedback signals, where the feedback signals are Hall signals.

The electronic expansion valve 100 further includes a valve needle 5, a valve seat 6, a valve body 7, and a valve port component 8. The valve needle 5 moves, driven by the rotor 1, between an upper dead point and a lower dead point. In a case that the valve needle 5 is at the lower dead point, a valve port is closed, and flow channels at two sides of the valve port are blocked. As the valve needle 5 moves from the lower dead point to the upper dead point, the valve port is gradually opened. The flow channels at the two sides of the valve port are in communication with each other through a gap between the valve port and the valve needle 5. In a case that the valve needle 5 arrives at the upper dead point, the valve port is opened to a maximum extent. In this embodiment, the flow channels at the two sides of the valve port are formed at the valve body 7, the valve port is located between the flow channels at the two sides of the valve port, the valve port is formed at the valve port component 8, the valve port component 8 is fixedly connected to the valve body 7, the valve seat 6 is fixedly connected to the valve body 7, and the valve needle 5 is connect to the rotor 1.

Referring to FIG. 3, the electronic expansion valve 100 further includes a screw rod 11, a nut component 12 and a stop rod 13. The nut component 12 is sleeved around the screw rod 11, and the nut component 12 and the screw rod 11 are in threaded engagement. The nut component 12 is fixed arranged with respect to the valve seat 6, and the screw rod 11 is able to move upward or downward with respect to the nut component 12. The stop rod 13 is fixedly connected to the screw rod 11 by a connection plate, the stop rod 13 moves upward or downward with respect to the nut component 12, and the stop rod 13 cooperate with the nut component 12 to limit movement of the screw rod 11 between the upper dead point and the lower dead point. Since the valve needle 5 is fixedly connected to the screw rod 11, movement of the valve needle 5 is limited in a distance between the upper dead point and the lower dead point. An elastic element 18 is arranged between the valve needle 5 and the screw rod 11, in this way, in a case that the valve needle 5 arrives at the lower dead point, the valve needle 5 is in elastic contact with the valve port component 8, to buffer the valve needle 5 and the valve port component 8, which is beneficial for improving lifetimes of the valve needle 5 and the valve port component 8.

Figure 4:
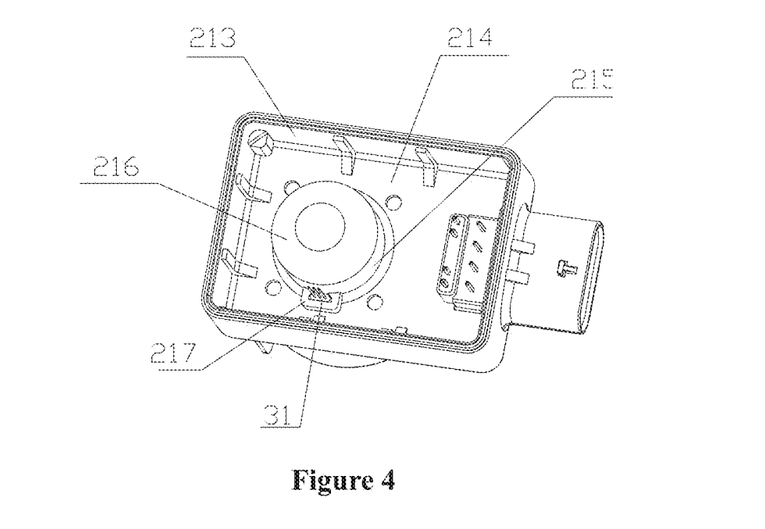
FIG. 4 is a schematic view showing a composite structure of an injection molding portion and a Hall sensor in FIG. 2.
Figure 5:
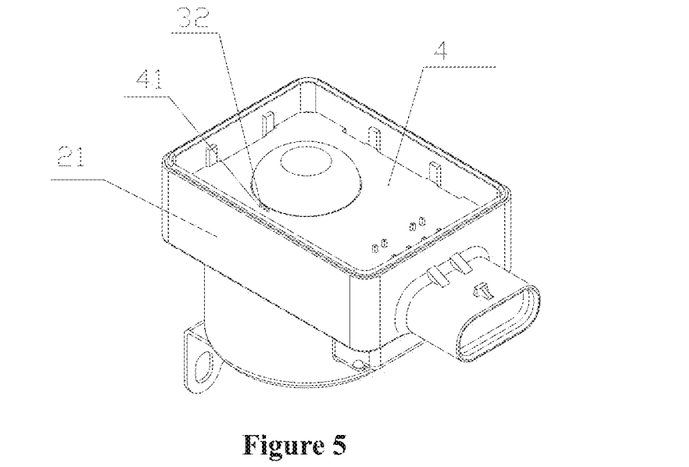
FIG. 5 is a schematic view showing a composite structure of the composite structure in FIG. 4 and a circuit board.

Referring to FIGS. 4 and 5, the electronic expansion valve 100 includes an injection molding portion 21, and the injection molding portion 21 is formed by injection molding in which the stator 2 is used as an insert. The electronic expansion valve 100 has a first cavity 211 and a second cavity 212. The injection molding portion 21 includes a first side wall 213 and a first bottom 214, the first cavity 211 is enclosed by the first side wall 213 and the first bottom 214, and the first cavity 211 and the stator 2 are axially arranged. The injection molding portion 21 includes a second side wall 215 and a second bottom 216, the second cavity 212 is enclosed by the second side wall 215 and the second bottom 216, and the second cavity 212 and the stator 2 are radially arranged. The circuit board 4 and the Hall sensor 3 are arranged in the first cavity 211, and the rotor 1 is arranged in the second cavity 212.

Specifically, in FIGS. 4 and 5, a cavity accommodating the stator 2 is formed at a lower end of the injection molding portion 21, a shell-like body having an upward opening is formed at an upper end of the injection molding portion 21. A periphery of the shell-like body is the first side wall 213. A part of a bottom of the shell-like body protrudes upward to form a protrusion portion. A periphery of the protrusion portion is the second side wall 215, a top surface of the protrusion portion is the second bottom 216, and an inner cavity formed by the protrusion portion is the second cavity 212. A part of the bottom of the shell-like body except the protrusion portion is the first bottom 214.

The electronic expansion valve 100 further includes a sleeve 9. The sleeve 9 is arranged in the second cavity 212, the sleeve 9 and the second side wall 215 isolate the stator 2 and the rotor 1, the sleeve 9 is fixedly connected to the valve seat 6, and the rotor 1 moves in an inner cavity enclosed by the sleeve 9.

The injection molding portion 21 includes a first partition portion and a second partition portion, the first partition portion includes the second side wall 215, and the second partition portion includes the first bottom 214. The first cavity 211 and the second cavity 212 are isolated from each other by the first partition portion, and the Hall sensor 3 and the stator 2 are isolated from each other by the second partition portion. An accommodation portion configured for fixing the Hall sensor is formed at the second partition portion.

The Hall sensor 3 includes a body portion 31 and a connecting portion 32, the connecting portion 32 is electrically connected to the circuit board 4, and the connecting portion 32 is fixed to the circuit board 4 by welding. Specifically, a through hole 41 is formed in the circuit board 4, and the connecting portion 32 is arranged to pass through the through hole 41 and is fixed to the circuit board 4 by welding.

The body portion 31 of the Hall sensor 3 is fitted tightly against a periphery of the second side wall 215. The injection molding portion 21 includes a projection portion 217, and the projection portion 217 is located in the first cavity 211. A mounting portion is formed between the projection portion 217 and the second side wall 215, and the Hall sensor 3 is limited in the first cavity 211 by the mounting portion. The projection portion 217 and the first bottom 214 are integrally injection-molded, and the Hall sensor 3 is arranged at the mounting portion and tightly fitted to the projection portion 217 and the second side wall 215. The mounting portion formed in this way has a simple structure, and changes to an original structure are relatively small, which is beneficial for cost saving. A thickness of the second side wall 215 is greater than or equal to 1 mm and less than or equal to 1.5 mm; or, in the radial direction of the rotor, a distance between a periphery of the rotor 1 to an inner side surface of the Hall sensor 3 is greater than or equal to 2 mm and less than or equal to 3 mm. In this way, both the strength of the second side wall 215 and the sensitivity of the Hall sensor 3 are ensured.

In this embodiment, the rotor 1 is lengthened. A length of the rotor 1 is greater than a sum of a length H1 of the magnetic conductive portion $2b1$ and a length H2 of the body portion of the Hall sensor 3. The rotor 1 includes a first upper end surface 15, and the first upper end surface 15 is away from the valve needle 5. The Hall sensor 3 includes a second upper end surface 311, and the second upper end surface 311 is away from the valve needle 5. In a case that the rotor 1 is located at the lower dead point, the first upper end surface 15 of the rotor 1 at the lower dead point is higher than or at least flush with the second upper end surface 311 of the Hall sensor 3. In this way, detection accuracy of the Hall sensor is ensured.

The length L of the rotor 1 is designed as above to ensure that the Hall sensor 3 can always detect the magnetic field changes and generate feedback signals during operation of the electronic expansion valve. It should be understood that, an object of providing the Hall sensor 3 is to detect the magnetic field changes, and therefore the Hall sensor may be arranged as long as the above object can be achieved. Actually, the Hall sensor 3 is arranged at a periphery of the permanent magnet, and an upper end of the permanent magnet is closer to the Hall sensor 3 than a lower end of the permanent magnet. The Hall sensor 3 is located at one end of the stator core, $2b$ the body portion of the Hall sensor 3 is arranged close to the periphery of the magnetic pole; and, at least a part of the body portion is always between the upper end and the lower end of the magnetic pole during movement of the permanent magnet. In this way, it is ensured that the Hall sensor 3 can always detect the magnetic field changes.

Figure 6:
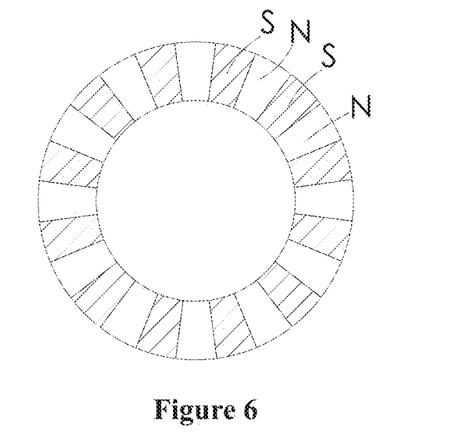
FIG. 6 is a schematic view showing the structure of a rotor in FIG. 2.

Referring to FIG. 6, the rotor 1 includes at least two pairs of magnetic poles 101, each pair of the magnetic poles 101 includes an N pole and an S pole, and N poles and S poles are alternately arranged in a circumferential direction of the rotor. In this embodiment, a two-phase stepping motor having 12 pairs of poles is employed by the electronic expansion valve, and the rotor 1 includes 12 N poles and 12 S poles. The Hall sensor 3 is arranged at the periphery of the rotor 1 and close to the rotor 1. When the rotor 1 rotates, N poles and S poles of the rotor 1 pass by the Hall sensor 3 alternately, the Hall sensor 3 generates periodic feedback signals, and the feedback signals are embodied as a square wave. The controller 20 acquires the feedback signals and determines operation states of the stepping motor according to states of the feedback signals. The operation states of the stepping motor include normal operation of the stepping motor, first rotor locking of the stepping motor, second rotor locking of the stepping motor and the like.

In this embodiment, a two-phase stepping motor having 12 pairs of poles is employed by the electronic expansion valve. The stepping motor 10 includes a rotor 1, and the rotor 1 includes 12 N poles and 12 S poles, that is, the rotor 1 includes 24 magnetic poles alternately arranged in the circumferential direction of the rotor 1. One feedback signal is generated each time that each of the magnetic poles of the rotor 1 passing by the Hall sensor changes from an N pole to an S pole or from an S pole to an N pole, that is, the feedback signal jumps from a low level to a high level or from the high level to the low level. As the stepping motor 10 operates for one revolution, that is, the rotor 1 rotates for one revolution, 24 feedback signals are generated. Duration in which a magnetic pole passes through the Hall sensor 3 is operation duration of the feedback signal.

In this embodiment, a control scheme of 16 micro-steps is adopted by the stepping motor of the electronic expansion valve. A full step includes 16 micro-steps. As the steeping motor operates for two full steps, the magnetic pole of the rotor changes once correspondingly, that is, the operation duration of one feedback signal includes duration corresponding to the two full steps, that is, the duration of 32 micro-steps in theory.

Figure 7:
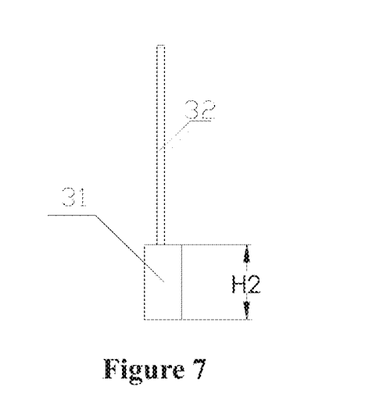
FIG. 7 is a schematic view showing the structure of a Hall sensor in FIG. 1.

Specifically, referring to FIG. 7, in a case that the electronic expansion valve is in normal operation, in the duration that the stepping motor operates for two full steps, the magnetic pole of the rotor corresponding to the Hall sensor 3 rotates from an end of an N pole to a junction between the N pole and an S pole, and the corresponding feedback signal is at a low level. With the operation of the stepping motor, the magnetic pole of the rotor corresponding to the Hall sensor 3 changes from the N pole to the S pole, and the feedback signal jumps to a high level. The stepping motor operates for two full steps, the magnetic pole of the rotor corresponding to the Hall sensor 3 rotates from the S pole to a junction between the N pole and an S pole, and the feedback signal is kept at the high level. With the operation of the stepping motor, the magnetic pole of the rotor corresponding to the Hall sensor 3 rotates from the S pole to an N pole, and the feedback signal jumps to the low level, thus the motor operates repeatedly. As the rotor rotates for one revolution, the stepping motor operates for 48 full steps, and 24 feedback signals are generated. The operation duration of the feedback signal at the high level and the low level is each equal to the duration corresponding to two full steps.

Figure 8:
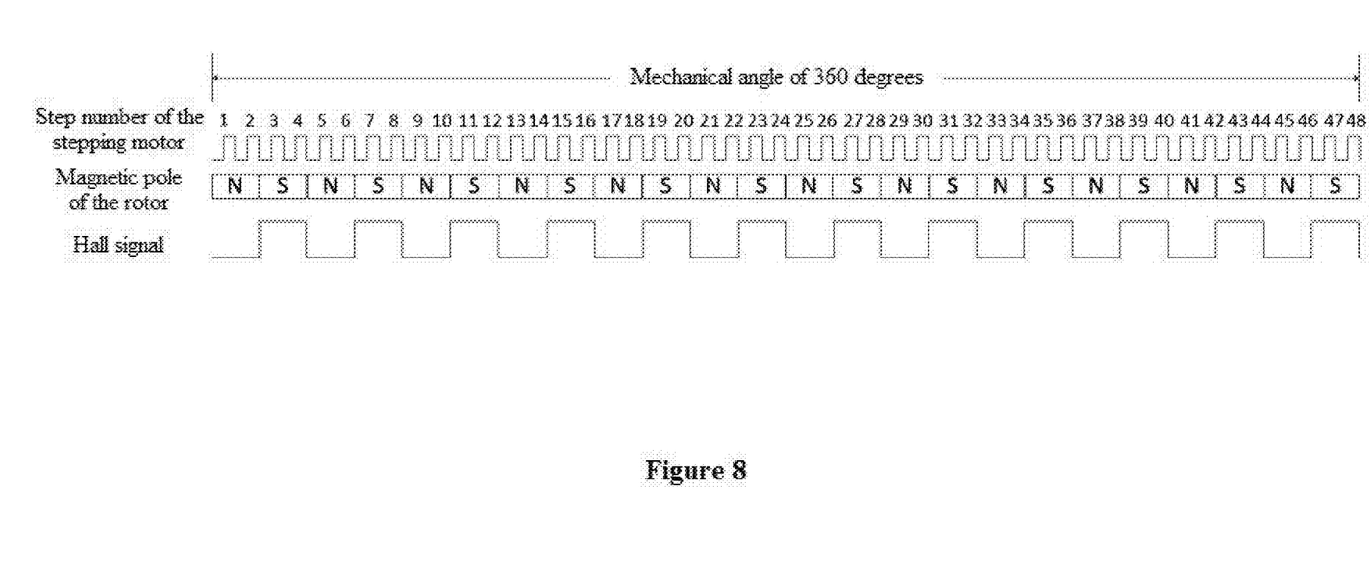
FIG. 8 is a schematic view showing a corresponding relationship among a step number of the stepping motor, a magnetic pole of the rotor, and a feedback signal with regard to time.

Reference is made to FIG. 8. In a case that the operation duration of the feedback signal detected by the controller is not equal to theoretic duration of two full steps, rotor locking of the stepping motor occurs. The rotor locking includes first rotor locking and second rotor locking, the second rotor locking generally occurs near the upper dead point and the lower dead point, and the first rotor locking generally occurs between the upper dead point and the lower dead point. In this embodiment, the duration of two full steps corresponding to the stepping motor is defined as a first time period. The first time period T relates to a rotational speed n, a number P of magnetic pole pairs of the rotor, and a number m of phases of the motor, and a specific relationship is: T=60/(n*m*P), where a unit of n is revolutions per minute, m=2 and P=12.

In a case that the first rotor locking of the electronic expansion valve occurs, usually the rotor does not rotate, therefore, the feedback signal is kept at a current state, and duration in which the feedback signal is kept at the high level or the low level exceeds duration corresponding to the first time period T.

In a case that the second rotor locking of the electronic expansion valve occurs, duration of the feedback signal may jump irregularly, and the duration in which the feedback signal is kept at the high level or the low level is less than the duration corresponding to the first time period T.

Specifically, in a case that the duration of the feedback signal is abnormal, if the duration in which the feedback signal is kept at the high level or the low level is not in a predetermined range of 0.5 times the first time period T to 2 times the first time period T, the first rotor locking of the electronic expansion valve occurs; and if the duration in which the feedback signal is kept at the high level or the low level is less than 0.5 times the first time period for multiple consecutive times, the second rotor locking of the electronic expansion valve occurs.

Figure 9:
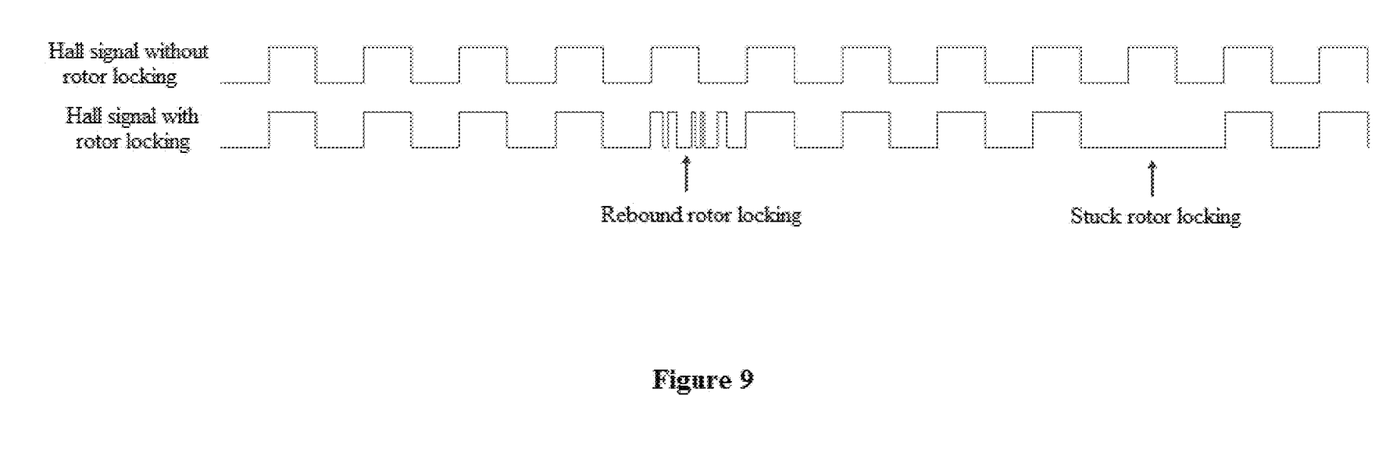
FIG. 9 is a schematic diagram showing a control principle of the electronic expansion valve.

Referring to FIG. 9, a control method for a control system is provided. The control system includes a stepping motor, a controller, and a Hall sensor. The stepping motor includes a rotor, and the rotor includes multiple magnetic poles. The control method includes following steps:

S1, operating the stepping motor to rotate the rotor;

S2, sensing magnetic pole changes of the rotor and generating feedback signals by the Hall sensor;

S3, acquiring the feedback signals in real time and obtaining operation duration of each of the feedback signals by the controller; and S4, determining, by the controller, whether rotor locking of the stepping motor occurs according to the operation duration of the acquired feedback signal. In a case that the rotor locking occurs, emitting a locked rotor alarm signal; and in a case that the rotor locking does not occur, determining that the stepping motor is in normal operation, proceeding with S2, and performing the process repeatedly.

Figure 10:
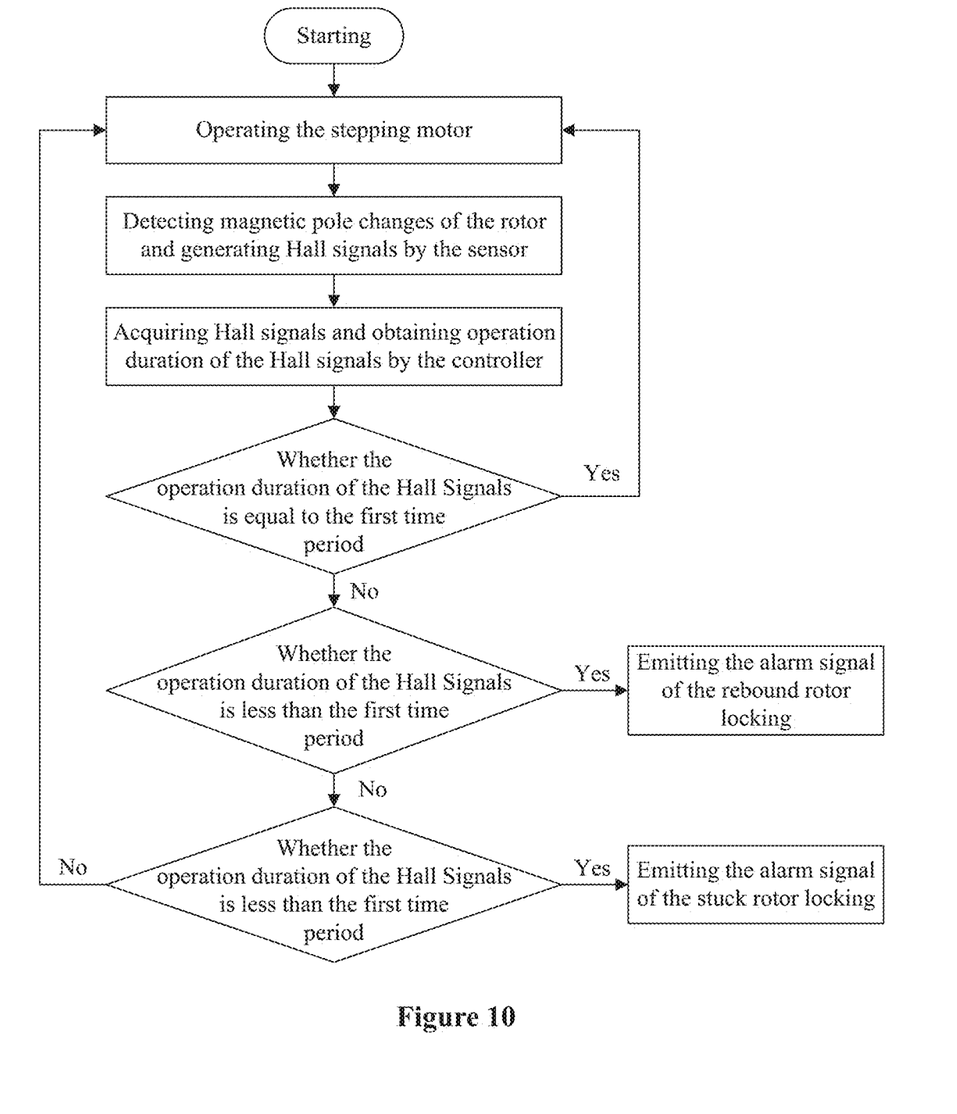
FIG. 10 is a schematic diagram showing control flow for determining whether rotor locking of the electronic expansion valve occurs.

In step S4, a first time period is prestored in the controller and the controller determines whether the operation duration is in a range from 0.5 times the first time period to 2 times the first time period. In a case that the operation duration is in the range from 0.5 times the first time period to 2 times the first time period, it is determined that the electronic expansion valve is in normal operation; and in a case that the operation duration is not in the range from 0.5 times the first time period to 2 times the first time period, it is determined that the rotor locking of the electronic expansion valve occurs.

The rotor locking includes first rotor locking. In a case that the controller determines that the operation duration of the feedback signal is greater than 2 times the first time period, the first rotor locking of the stepping motor occurs, and the controller emits a locked rotor alarm signal of the first rotor locking.

The rotor locking includes second rotor locking. During the first time period, in a case that the controller determines that the operation duration of at least two consecutive feedback signals is each less than 0.5 times the first time period, the second rotor locking of the stepping motor occurs, and the controller emits a locked rotor alarm signal of the second rotor locking.

In step S4, firstly, determining, by the controller, whether the operation duration of the feedback signal is greater than the first time period. In a case that the operation duration of the feedback signal is greater than the first time period, the first rotor locking of the stepping motor occurs, and emitting, by the controller, the locked rotor alarm signal of the first rotor locking. In a case that the operation duration of the feedback signal is not greater than the first time period, then determining, by the controller, whether the operation duration of at least two consecutive feedback signals is each less than the first time period, in a case that a determination result of whether the operation duration of at least two consecutive feedback signals is each less than the first time period is YES, the second rotor locking of the stepping motor occurs, and emitting, by the controller, the locked rotor alarm signal of the second rotor locking; and in a case that the determination result of whether the operation duration of at least two consecutive feedback signals is each less than the first time period is NO, determining that the stepping motor is in normal operation, proceeding with S2, and performing the process repeatedly.

A control method for a control system is further provided according to the present application. The control system includes a controller, a stepping motor, a Hall sensor, a valve body and a valve needle. The stepping motor includes a rotor and a stator, the rotor is connected to the valve needle, and the valve body is connected to the stator. A first flow channel and a second flow channel are formed in the valve body, and the valve needle cooperates with the valve body to allow or shut off communication between the first flow channel and the second flow channel. The Hall sensor detects magnetic poles changes of the rotor and generates feedback signals. The control method includes following steps.

Powering on the control system, and the control system is started. Driving, by the rotor, the valve needle to move from a position where the valve needle is stopped last time to an upper dead point, and then to a lower dead point and stop at the lower dead point. Defining a position at which the valve needle is stopped at the lower dead point as a mechanical zero. Restarting the control system, and driving, by the rotor, the valve needle to move from the lower dead point to the upper dead point, and detecting the feedback signals at the same time. Defining, before the first flow channel and the second flow channel are in communication with each other, a point at which the valve needle is located when a feedback signal jumps during upward movement of the valve needle as a Hall origin. Defining a number of pulses between the Hall origin and a point at which the valve needle is located when the first flow channel and the second flow channel are in communication with each other as a valve opening pulse. With this control method, a definite valve opening pulse is obtained by detecting the Hall origin, thus an influence of the elastic element on the valve opening pulse when the valve needle is at the lower dead point is avoided, which is beneficial for ensuring the consistency of pre-delivery inspection of products.

A point, at which the feedback signal jumps for a first time during the upward movement of the valve needle, is defined as the Hall origin. In this way, counting for calculating the feedback signals is omitted, and the operation is simpler.

In a case that the electronic expansion valve is in normal operation, the controller controls the stepping motor by micro-step control. The stepping motor is a two-phase motor. Duration in which the stepping motor operates for two full steps is equal to operation duration of the feedback signal. Each of the full steps includes multiple micro-steps. The valve opening pulse is equal to multiple micro-steps, and a number of valve opening pulses is equal to a number of multiple micro-steps in each of the full steps.

It should be noted that, the above embodiments are only used to illustrate the present application and not intended to limit the technical solutions of the present application. Although the present application is described in detail with reference to the above embodiments, it should be understood by those skilled in the art that, various modifications and equivalents can be made to the technical solutions of the present application without departing from the spirit and scope of the present application, all of which should be contained within the scope of the claims of the present application.

The invention claimed is:

1. A control method, wherein the control method is realized by a control system, and the control system comprises a controller, a stepping motor, a Hall sensor, a valve body and a valve needle; the stepping motor comprises a rotor and a stator, the rotor is connected to the valve needle, the valve body is connected to the stator; a first flow channel and a second flow channel are formed in the valve body, and the valve needle is configured to cooperate with the valve body to allow or shut off communication between the first flow channel and the second flow channel; the Hall sensor is configured to detect magnetic pole changes of the rotor and generate feedback signals; and the control method comprises:

starting the control system, and driving, by the rotor, the valve needle to move from a position where the valve needle is stopped to an upper dead point, and then to a lower dead point and stop at the lower dead point;

defining a position close to the lower dead point at which the valve needle is stopped as a mechanical zero;

restarting the control system, and driving, by the rotor, the valve needle to move from the lower dead point to the upper dead point, and at the same time, detecting the magnetic pole changes of the rotor and generating feedback signals by the Hall sensor, and detecting the feedback signals, and defining, before the first flow channel and the second flow channel are in communication with each other, a point at which the valve needle is located when a feedback signal jumps during upward movement of the valve needle as a Hall origin; and defining a number of pulses between the Hall origin and a point at which the valve needle is located when the first flow channel and the second flow channel are in communication with each other as a valve opening pulse.

2. The control method according to claim 1, comprising:
defining a point at which the valve needle is located when the feedback signal jumps for a first time during the upward movement of the valve needle as the Hall origin.

3. The control method according to claim 1, wherein
in a case that an electronic expansion valve is in normal operation, the controller controlling the stepping motor by micro-step control; the stepping motor is a two-phase motor, and duration in which the stepping motor operates for two full steps is equal to operation duration of the feedback signal; each of the full steps comprises a plurality of micro-steps, the valve opening pulse is equal to a plurality of micro-steps, and a number of valve opening pulses is equal to a number of the plurality of micro-steps in each of the full steps.

4. The control method according to claim 1, further comprising:

S1, operating the stepping motor to rotate the rotor;

S2, sensing magnetic pole changes of the rotor and generating feedback signals by the Hall sensor;

S3, acquiring the feedback signals in real time and obtaining operation duration of each of the feedback signals by the controller; and S4, determining, by the controller, whether rotor locking of the stepping motor occurs according to the operation duration of the acquired feedback signal; in a case that the rotor locking occurs, emitting a locked rotor alarm signal; and in a case that the rotor locking does not occur, determining that the stepping motor is in normal operation, proceeding with S2, and performing the process repeatedly.

5. The control method according to claim 4, further comprising: in step S4, prestoring a first time period in the controller, and determining, by the controller, whether the operation duration is in a range from 0.5 times the first time period to 2 times the first time period; in a case that the operation duration is in the range from 0.5 times the first time period to 2 times the first time period, determining that an electronic expansion valve is in normal operation, proceeding with S2 and performing the process repeatedly; and in a case that the operation duration is not in the range from 0.5 times the first time period to 2 times the first time period, determining that the rotor locking of the electronic expansion valve occurs.

6. The control method according to claim 5, wherein the rotor locking comprises first rotor locking, in a case that the controller determines that the operation duration of the feedback signal is greater than 2 times the first time period, the first rotor locking of the stepping motor occurs, and emitting, by the controller, a locked rotor alarm signal of the first rotor locking.

7. The control method according to claim 6, wherein the rotor locking comprises second rotor locking, and in the first time period, in a case that the controller determines that the operation duration of at least two consecutive feedback signals is each less than 0.5 times the first time period, the second rotor locking of the stepping motor occurs, and emitting, by the controller, a locked rotor alarm signal of the second rotor locking.

8. The control method according to claim 7, further comprising:

in step 4, firstly, determining, by the controller, whether the operation duration of the feedback signal is greater than the first time period;

in a case that the operation duration of the feedback signal is greater than the first time period, the first rotor locking of the stepping motor occurs, and emitting, by the controller, the locked rotor alarm signal of the first rotor locking; and in a case that the operation duration of the feedback signal is not greater than the first time period, the first rotor locking of the stepping motor occurs, then determining, by the controller, that the operation duration of at least two consecutive feedback signals is each less than the first time period, the second rotor locking of the stepping motor occurs, and emitting, by the controller, the locked rotor alarm signal of the second rotor locking, and in a case that a determination result of whether the operation duration of at least two consecutive feedback signals is each less than the first time period is NO, determining that the stepping motor is in normal operation, proceeding with S2, and performing the process repeatedly.

* * * * *